United States Patent [19]

Watts

[11] 3,830,346

[45] Aug. 20, 1974

[54] SAFETY BRAKE

[76] Inventor: Robert H. Watts, 5760 Beech Grove Ln., Cincinnati, Ohio 45238

[22] Filed: Jan. 5, 1973

[21] Appl. No.: 321,291

[52] U.S. Cl. .............................. 188/188, 188/136
[51] Int. Cl. ............................................ F16d 59/02
[58] Field of Search ............ 188/44, 65.4, 136, 188, 188/189

[56] References Cited
UNITED STATES PATENTS

| | | | |
|---|---|---|---|
| 1,165,583 | 12/1915 | Farmer | 188/189 |
| 3,215,231 | 11/1965 | Lodige | 188/189 |
| 3,327,811 | 6/1967 | Mastroberte | 188/188 X |
| 3,669,223 | 6/1972 | Arnold | 188/188 |
| 3,706,361 | 12/1972 | Paulssen et al. | 188/189 |

*Primary Examiner*—Duane A. Reger
*Attorney, Agent, or Firm*—Michael, Best & Friedrich

[57] ABSTRACT

The safety brake is adapted for use in conjunction with scaffolding or other apparatus in position on the tensioned line between a traction device and the point to which the line is attached. The housing would be attached to the apparatus supported by the traction device. The tensioned line passes through the housing between the two gripping shoes, one of which is spring loaded in a direction parallel to the path of the line. The other shoe is normally latched in a position permitting clearance for the rope between the shoes but is spring biased along a path converging with that of the first shoe so that upon release it will move to engage the rope whereupon the other shoe starts moving with the first. At this point the rope is gripped and the gripping force increases due to the converging paths of the shoes. The spring loading the passive shoe is compressed to absorb the shock of grabbing the rope and prevent breaking the rope as could occur with an instantaneous stop.

The latch is spring loaded to engage the active shoe and is released when one of the centrifugal weights mounted on the roller swings out to strike the pin carried by the latch. The periphery of the roller moves at rope speed since the pinch roller adjacent the centrifugal weight roller squeezes the rope enough to force rotation of both rollers. After the brake has operated, it can be normally released (assuming the load is off the line) by pushing down on a knob to force the active shoe back to its latched position. If, however, there has been a large load applied to the rope during the stopping action, no practical force on the knob will be adequate to reset the brake. Under these conditions it is necessary to remove the cover to gain access to the cap screw and back off the cap screw and permit the base plate carrying the active shoe to be rotated away from the passive shoe and thus release the rope. In use the presence of the cap screw is concealed and, hence, the user is not tempted to bypass the safety mechanism.

3 Claims, 4 Drawing Figures

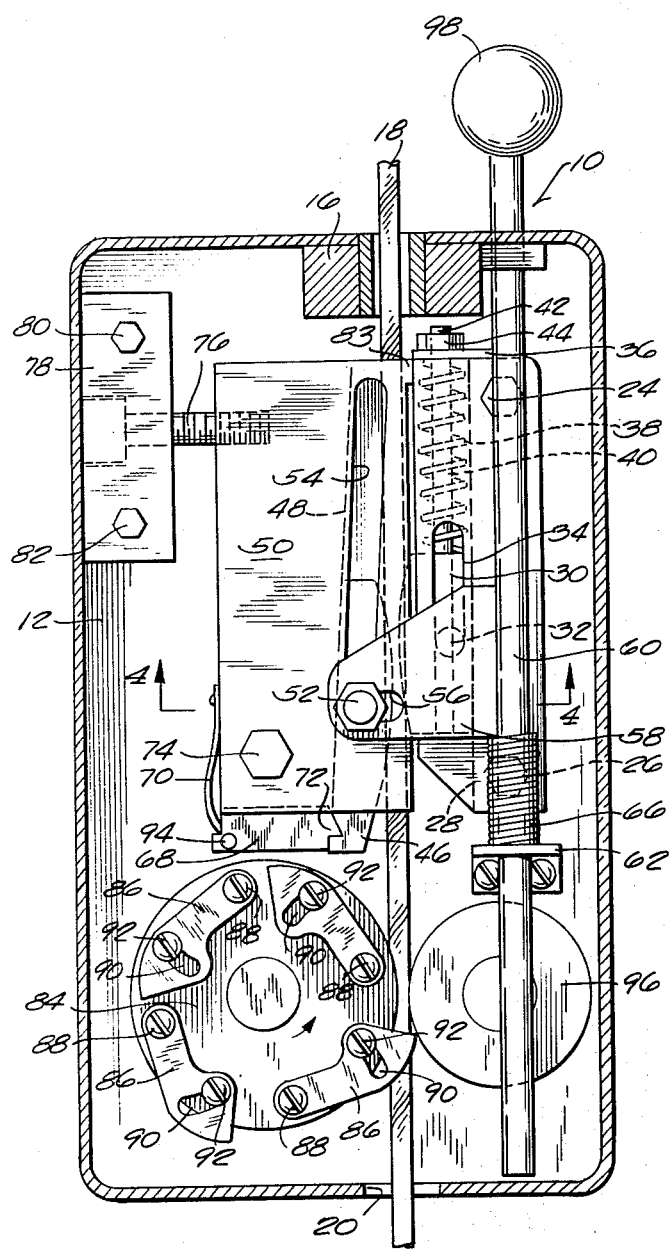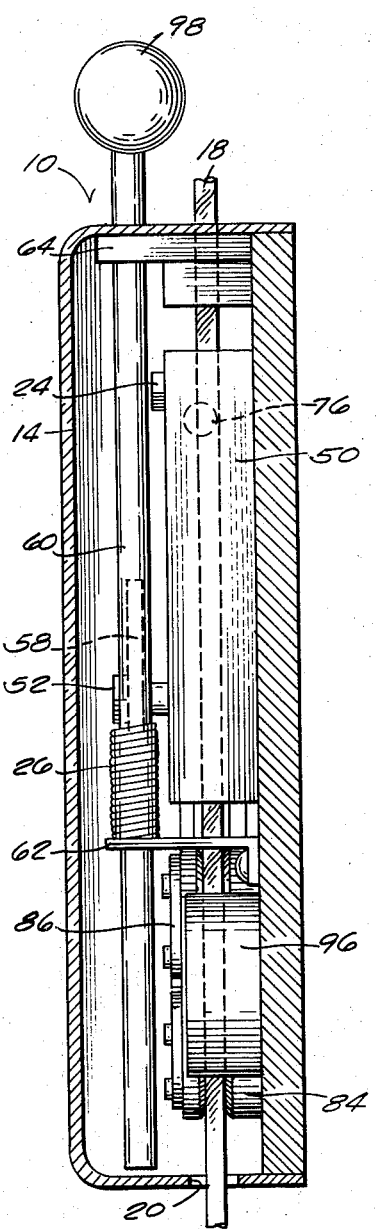

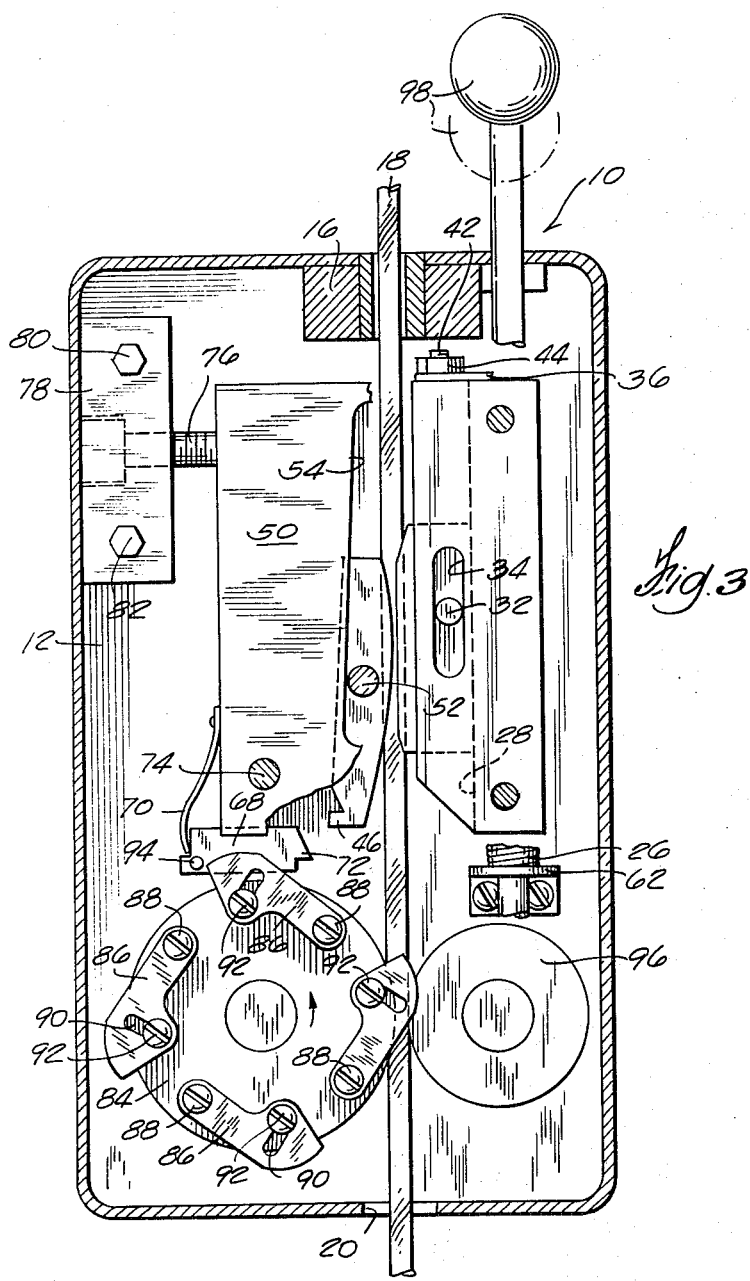
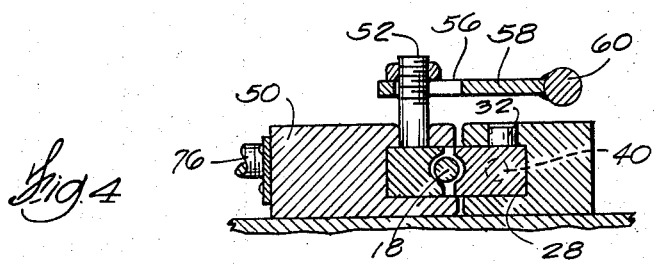

SAFETY BRAKE

BACKGROUND OF THE INVENTION

Safety brakes of the type disclosed here are used in conjunction with swing stages and other apparatus supported on wire rope. This could be applicable to dumbwaiters, for example. Generally there is a hoist of some kind carried by the work platform or other device. If the hoist fails, the wire rope supporting the platform will start running out at a high speed. Safety brakes are generally supported on the platform between the hoist motor and the anchor for the rope to grip the rope if it starts running through the safety brake at a rate indicative of hoist failure.

In the past such devices have been of open construction giving rise to the temptation to bypass the safety brake. Some prior art devices have been relatively slow acting, that is a considerable amount of line could pay out before the device stopped the fall. Another fault is that there was no way of insuring that the safety brake was inspected after being subjected to unusually high loads in performing its safety function. Thus, while such devices should be easily put back into operation when they operate under what might be termed normal conditions, it is desirable that they be inspected in the event an unusually high load has been applied to determine whether critical parts have been overstressed and should be replaced, etc.

SUMMARY OF THE INVENTION

The present safety brake totally encloses the working parts, thus keeping the parts relatively free from contaminants which can range from normal dirt and grease to mortar and the like. The design is such that it is extremely fast in operation and operates to grip the free running line within a matter of a very few inches. If the device has been operated under what may be termed normal loading, the brake mechanism can be reset to the safety position by moving the external knob downwardly to reset the active shoe to its latched position. However, if the load has been unduly large, the gripping action on the rope combined with the small angle of convergence of the shoes will result in such a large force that the force available through normal manual reset operation is inadequate to release the brake mechanism. The user is instructed that if this occurs, the entire unit should be shipped back to the manufacturer for repair and inspection. The manufacturer need only remove the housing to gain access to the cap screw which locks the base supporting the active shoe in position whereupon the base can now be rotated about a pivot pin to move the active shoe away from the passive shoe. The device can thereafter be restored to normal use after the manufacturer is satisfied that all parts are in good condition.

DESCRIPTION OF THE DRAWINGS

FIG. 1 is a vertical elevation with the housing cover sectioned to reveal the internal parts of the safety brake mechanism.

FIG. 2 is a vertical section taken from the right in FIG 1 further giving orientation of the parts.

FIG. 3 is a view similar to FIG. 1 but shows the brake with the parts positioned after having been actuated, that is the shoes are now gripping the rope.

FIG. 4 is a cross section taken on line 4—4 of FIG. 1.

DESCRIPTION OF THE PREFERRED EMBODIMENT

The safety brake mechanism is enclosed in a housing 10 having base plate 12 and cover 14. The cover can be secured to the base plate by conventional means or, if desired, can be wired to the base with a seal which would have to be broken to gain access to the interior, the object here being to invalidate the warranty if the seal is broken. Line guide 16 is secured to the base plate at the upper end and is apertured to receive wire rope 18. The wire rope passes down through cover 14 and comes out of aperture 20 at the bottom. Referring to FIG. 1, casting 50 is secured to the base plate by bolts 74, 76. This casting includes a longitudinal groove 28 which receives passive brake shoe 30. This shoe is constrained to longitudinal movement relative to casting 50 by virtue of the groove and the cap screw 32 fixed in the shoe with its head slidable in the slot 34 in the casting. This essentially guides the shoe and determines the limits of shoe movement. The casting includes an end plate 36 and spring 38 is compressed between the plate 36 and the shoe to bias the shoe downwardly to the limit determined by engagement of cap screw 32 with the end of slot 34. The spring is mounted on the outside of pin 40, the lower end of which projects into a cooperating aperture in the shoe and the upper end of which seats against the plate 36 with a reduced diameter threaded portion 42 of the pin projecting through an aperture in the plate 36 to receive nut 44 which holds the pin in place. It will be noted that shoe 30 is movable in a path parallel to the rope 18. This shoe 30 will hereafter be referred to as the passive shoe.

On the other side of the rope an active shoe 46 is slidable in a cooperating groove 48 in casting 50. The groove angle relative to the rope is 3° so the active shoe moves on a converging path relative to the rope (and to the passive shoe) as it moves upwardly. The active shoe is restrained in and guided by the groove by means of bolt 52 threaded into the shoe with its shank received in the guide slot 54 in the outside face of casting 50. The shank also passes through slot 56 in bracket 58 projecting laterally from and fixed to rod 60 which is guided for vertical movement in brackets 62 and 64. Spring 66 is compressed between the laterally projecting bracket 58 and bracket 62 biases the rod 60 upwardly. If there is no restraint applied, this spring will drive the rod upwardly which, in turn, will move bolt 52 upwardly and carry shoe 46 upwardly on the converging path relative to the passive shoe.

Normally the active shoe is restrained against upward movement by means of latch 68 slidably mounted on the lower end of casting 50 and urged by spring 70 to the position shown in FIG. 1 where the nose 72 engages the notch in the lower end of shoe 46. Casting 50 is secured to the base plate 12 by means of bolt 74 which additionally serves as a pivot point for the casting 50. Normally the casting cannot pivot about bolt 74 since the upper end of the casting is fixed in position by means of cap screw 76 threaded through bracket 78 secured to the base plate by bolts 80,82 so that the end of the bolt is received in a blind hole in the casting to push the stop pad 83 against casting 22, at which time casting 50 is correctly positioned relative to the wire rope 18 and the passive shoe casting with slot 54 and the groove for the shoe 46 at an angle of 3°. It will be appreciated the cap screw is not accessible without removal of the cover. Thus there is no temptation to back the screw off and, in effect, render the brake mechanism inoperative.

Two rollers are positioned below the brake shoes. One roller 84 carries four centrifugal trip members 86. Each trip member is pivoted on a pin 88 to readily flop back and forth between the limits of movement determined by slot 90 engaging screw 92 passing through the slot. In the normal operation, when a trip member is in the lower half of the rotation, gravity will swing it out outwardly (down) but as it continues around it will, at normal rotational speeds, flop back into the position shown in FIG. 1. However, if the roller 84 rotates at a high speed, the centrifugal force acting on the trip member 86 will be sufficient to overcome gravity and swing the trip member out to strike pin 94 projecting from the side of latch 68. If the roller is rotating counterclockwise (indicative of a fall or drop), the latch will be moved to the left against the bias of spring 70 and will release the active shoe 46 for upward movement under the bias of spring 66. The roller 84 is forced to move at the same peripheral speed as the rope 18 due to the resilient face of roller 96 squeezing the rope and insuring that both rollers move with the rope as the rope passes through the housing. If the roller is rotated at high speed in the clockwise direction, the trip members will not release the latch since they are shaped to be cammed back under these conditions. This allows rope to be pulled through at high speed when rigging.

As indicated above, the initial movement of the brake shoe 46 is obtained from spring 66 acting on rod 60, bracket 58 and the shoe through the medium of bolt 52. After the shoe has moved upwardly a slight amount, it will, due to the converging path relative to the passive shoe, engage the rope with sufficient force that it tends to lock relative to the rope. At this time the force will be rapidly increasing and the passive shoe will start to move upwardly in unison with the active shoe and against the bias of spring 38 acting on the passive shoe. This acts as a shock absorber. Thus, instead of suddenly stopping the rope, it is brought to what may be called a cushioned stop in a matter of a couple inches. This cushioning effect is sufficient to avoid breaking the rope.

After the brake has set, it is necessary to first relieve the tension acting on the rope. If the brake sets due to failure of the hoist below the safety brake and the hoist is repaired and made operative to put tension on line 18 or to pull line 18 through the housing, it will relieve the jamming force on the shoes and the operator can push down on knob 98 at the upper end of rod 60 to move the rod downwardly against the bias of spring 66 to move the active shoe 46 down until it is again retained in its inactive position by latch 68. If the hoist cannot be reactivated to pull the rope back out of the jammed shoes, then the load of the platform to which the safety brake is attached can be transferred to another line to allow rope 18 to go slack. At that time, assuming the force jamming the shoes is not too great, the knob can be pushed down manually (or with the aid of a hammer) to reset the safety brake mechanism. But if the jamming force is too great, this expedient will not work. Under these conditions the user is instructed to return the assembly to the factory or repair station for attention. At the repair station the cover 14 is removed to give access to the cap screw 76 which can now be backed off to permit casting 50 to swing about the pivot 74 in a counterclockwise direction and move shoe 46 away from the passive shoe and thus relieve the jam. At this point the active shoe can be reset and the casting 50 moved back into position after first being satisfied that all parts are still sound. It is desired to hide the cap screw facility so as to avoid the temptation for the user to bypass the safety brake mechanism, particularly when stripping rope from the brake to avoid the speed limitation imposed by this mechanism. Experience shows that the user frequently forgets to reactivate a bypassed safety.

If the casting 50 were simply bolted to base 12 — instead of using cap screw 76 to position the casting — the very large shear load on the bolt after the shoes jam under large loading would prevent loosening the bolt. The cap screw can be backed off under such conditions even though under a large axial load.

If desired, friction surfaces may be employed between shoe 30 and casting 22 to increase the energy dissipation over that obtained with spring 38. In some instances the spring could be eliminated and only friction surfaces used.

It will be appreciated this brake can be used any place desired and need not be used only in conjunction with a hoist.

I claim:
1. A safety brake comprising,
a base,
means guiding a rope over the base along a predetermined line,
a first gripping shoe mounted on the base for linear movement generally parallel to said line between a normal position and an engaged position,
a first spring biasing the shoe to its normal position, a second shoe mounted on the base for linear movement along a path which converges relative to said line and to the path of travel of the first shoe,
means retaining the second shoe in a normal position in which it is spaced from the first shoe far enough to permit a rope to pass freely between the shoes, a second spring biasing the second shoe to move from said normal position to converge upon the first shoe until the rope between the shoes is gripped by both shoes and the first shoe moves from its normal position against the bias of the first spring while the load on the rope is transmitted to the shoes to increase the grip and the shock of the shoes gripping the rope is absorbed by said first spring, and
means mounted on the base sensing the linear speed of the rope relative to the base and operative upon sensing excessive rope speed in one direction only to render said retaining means inoperative whereby the second shoe is released for movement under influence of said second spring.

2. A safety brake according to claim 1 in which one of the shoes is carried on a plate which is mounted on the base for limited pivotal movement to allow the associated shoe to be moved away from the other shoe and thus release the rope, means for positively fixing said plate on the base for normal operation and manually operable to release the plate for pivotal movement.

3. A safety brake according to claim 2 including a housing enclosing the shoes and said sensing means and apertured to permit rope to pass through the housing, means operative from outside the housing to push said second shoe from its released position to its normal position, said housing enclosing said fixing means.

* * * * *